(12) United States Patent
Gannon et al.

(10) Patent No.: US 7,387,252 B2
(45) Date of Patent: Jun. 17, 2008

(54) OPTICAL READER WITH IMPROVED LENS FOCUSING SYSTEM

(75) Inventors: Colleen Patricia Gannon, Jordan, NY (US); Jeffrey Allen Scholten, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 11/504,495

(22) Filed: Aug. 15, 2006

(65) Prior Publication Data

US 2008/0041954 A1 Feb. 21, 2008

(51) Int. Cl.
*G06K 7/10* (2006.01)

(52) U.S. Cl. ............. 235/462.43; 235/454; 235/472.01

(58) Field of Classification Search ................ 235/454, 235/462.22, 462.23, 462.35, 462.45, 462.43, 235/472.01, 455, 462.32
See application file for complete search history.

(56) References Cited

U.S. PATENT DOCUMENTS

| | | | | | |
|---|---|---|---|---|---|
| 1,727,900 | A | * | 9/1929 | Patterson | ...................... 353/23 |
| 2,445,651 | A | * | 7/1948 | Weavie | ........................ 352/102 |
| 2,645,869 | A | * | 7/1953 | Cook | ......................... 353/112 |
| 2,999,421 | A | * | 9/1961 | Welch | .......................... 353/33 |
| 3,251,285 | A | * | 5/1966 | Uterhart | ....................... 396/72 |
| 3,259,044 | A | * | 7/1966 | MacMillin et al. | ........... 396/72 |
| 4,018,520 | A | * | 4/1977 | Aste | ........................... 353/101 |
| 4,045,128 | A | * | 8/1977 | Momiyama | .................. 359/745 |
| 4,656,565 | A | * | 4/1987 | Maglica | ...................... 362/187 |
| 4,658,336 | A | * | 4/1987 | Maglica | ...................... 362/197 |
| 4,851,974 | A | * | 7/1989 | Maglica | ...................... 362/187 |
| 5,021,641 | A | * | 6/1991 | Swartz et al. | .......... 235/462.36 |
| 5,780,834 | A | * | 7/1998 | Havens et al. | ........... 235/462.1 |
| 5,886,332 | A | * | 3/1999 | Plesko | .................... 235/472.01 |
| 6,060,722 | A | * | 5/2000 | Havens et al. | ............... 250/566 |
| 2003/0029917 | A1 | * | 2/2003 | Hennick et al. | ............ 235/454 |
| 2003/0034394 | A1 | * | 2/2003 | Gannon et al. | ............. 235/454 |
| 2003/0080189 | A1 | * | 5/2003 | Patel et al. | ................. 235/454 |
| 2004/0069855 | A1 | * | 4/2004 | Patel et al. | ............ 235/472.01 |
| 2004/0159703 | A1 | * | 8/2004 | Kogan et al. | ................ 235/454 |

* cited by examiner

*Primary Examiner*—Michael G. Lee
*Assistant Examiner*—Paultep Savusdiphol
(74) *Attorney, Agent, or Firm*—Richard A. Romanchik (57) ABSTRACT

An optical reader comprising: an image sensor array of pixels for converting light reflected from a target containing a machine readable indicia into output signals representative thereof; a housing for holding the image sensor array; a processor for decoding the output signals; receive optics for directing light from the target to the image sensor, the optics having a focal point; a generally cylindrical barrel for containing the receive optics, the barrel having a protrusion provided thereon; a generally cylindrical sleeve for receiving the barrel, the sleeve being secured to the housing and having a shoulder for engagement with the protrusion, wherein moving the protrusion along the shoulder facilitates focusing of the receive optics relative to the image sensor.

14 Claims, 6 Drawing Sheets

OPTICAL READER WITH IMPROVED LENS FOCUSING SYSTEM

FIELD OF THE INVENTION

The present invention relates to optical reading devices, and more particularly to an optical reading device with an improved lens focusing system.

BACKGROUND

Optical reading devices typically read data represented by symbols. For instance one type of a bar code symbol is an array of rectangular bars and spaces that are arranged in a specific way to represent elements of data in machine readable form. Optical reading devices typically transmit light onto a symbol and receive light scattered and/or reflected back from a bar code symbol or indicia. The received light is interpreted by an image processor to extract the data represented by the symbol.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures. Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a network computer.

Conventionally, a reader, whether portable or otherwise, may include a central processor which directly controls the operations of the various electrical components housed within the bar code reader. For example, the central processor controls detection of keyboard entries, display features, wireless communication functions, trigger detection, and bar code read and decode functionality.

Efforts regarding such systems have led to continuing developments to improve their versatility, practicality and efficiency.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art. Wherever possible, the same reference numbers will be used throughout the drawings to refer to the same or like parts. The term "scan" or "scanning" use herein refers to reading or extracting data from an information bearing indicia or symbol.

An exemplary optical reader system in accordance with the invention may be adapted for reading symbol indicia for numerous functions. A detailed description of optical readers and their operation is disclosed in commonly owned published United States Patent Application Publication No. 20030029917 entitled OPTICAL READER FOR IMAGING MODULE and United States Patent Application Publication No. 20030019934 entitled OPTICAL READER AIMING ASSEMBLY COMPRISING APERTURE, United States Patent Application Publication No. 20040134989 entitled DECODER BOARD FOR AN OPTICAL READER UTILIZING A PLURALITY OF IMAGING FORMATS which are hereby incorporated herein by reference.

Figure 1:
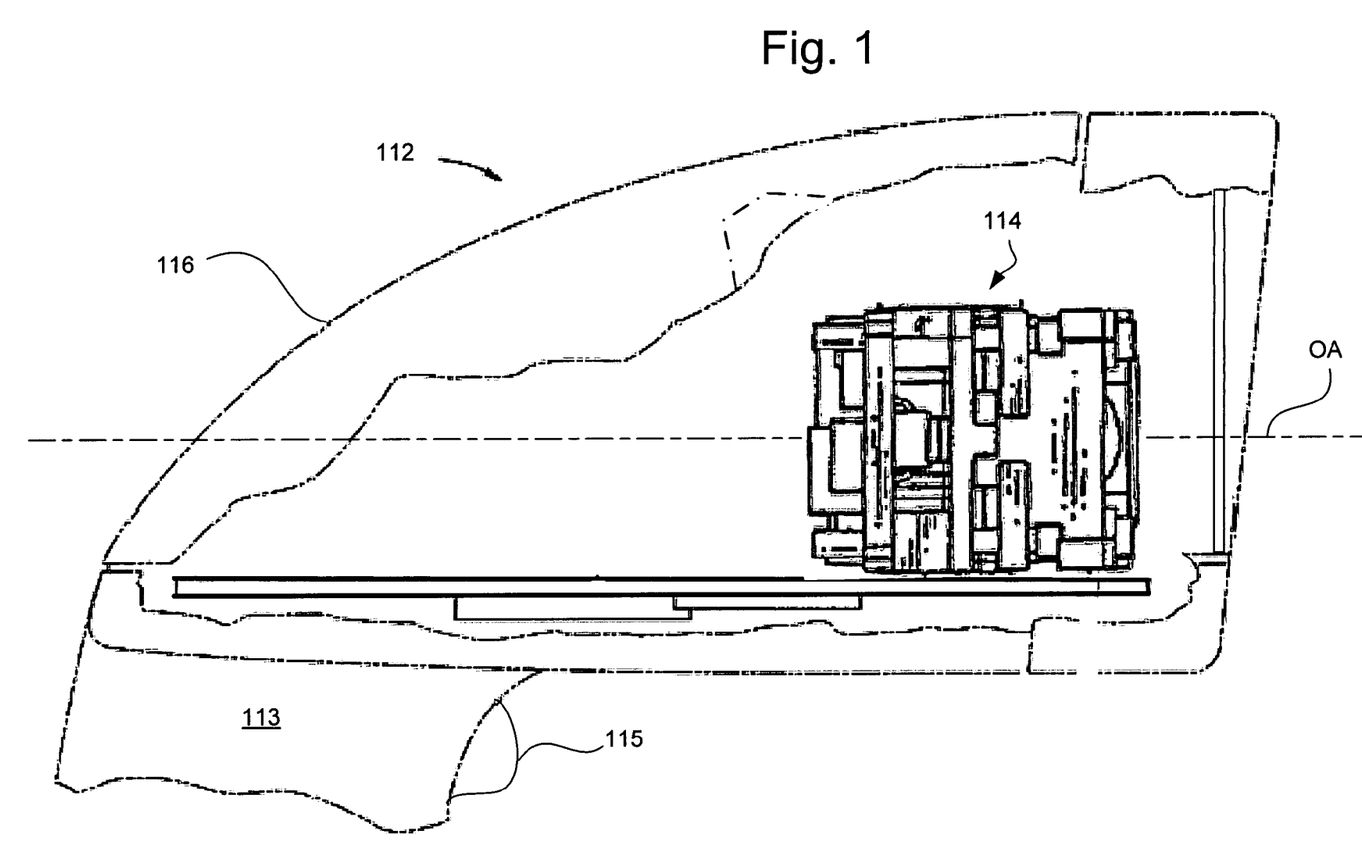
FIG. 1 is a fragmentary partially cutaway side view of an exemplary reader in accordance with the invention.
Figure 2:
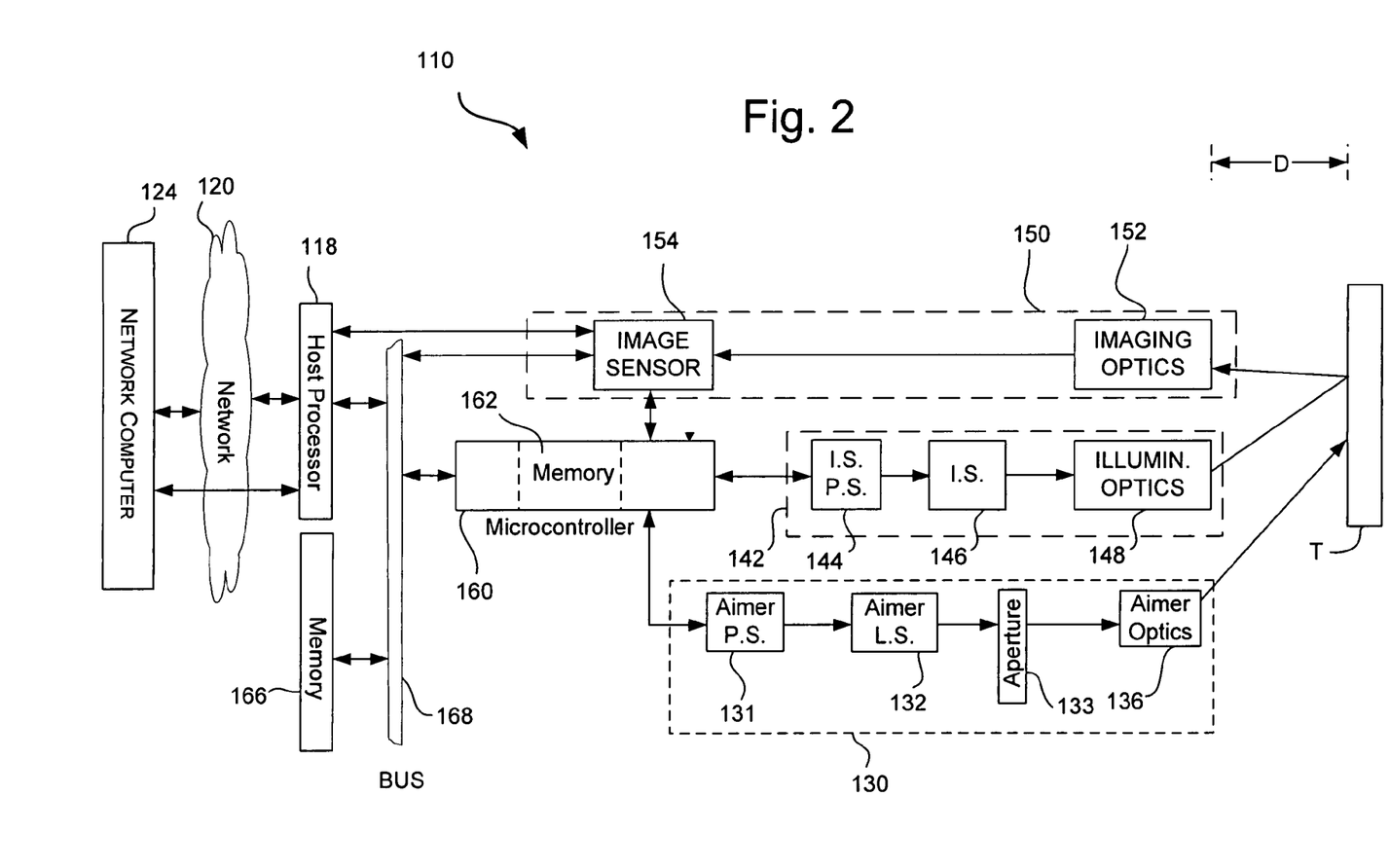
FIG. 2 is a block schematic diagram of an exemplary optical reader in accordance with the invention.

Referring to FIGS. 1 and 2, an optical or indicia reader 112 may have a number of subsystems for capturing and reading images, some of which may have symbol indicia provided therein. Reader 112 may have an imaging reader assembly 114 provided within a head portion or housing 116 which may be configured to be hand held by a handle portion 113. A trigger 115 may be used to control operation of the reader 112. The head portion 116 may have a medial plane MP selected so that the hand-held imager is held with the head portion generally in a horizontal plane. The medial plane MP will generally be perpendicular to the face of the scanning head 116. Generally operators have a tendency to hold the medial plane of the head portion of the imager approximately normal to the plane of the target when collecting data. Image reader assembly 114 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1 D or 2D bar code symbol or text or other machine readable indicia. A trigger 115 may be used for controlling full or partial operation of the reader 112.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc. or model number VC5602V036 36CLCC from STMicroelectronics.

Further description of image sensor operation is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions, such as controlling the amount of illumination provided by illumination source 146 by controlling the output power provided by illumination source power supply 144. Microcontroller 160 may also control other functions and devices. An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects. Microcontroller 160 may include a predetermined amount of memory 162 for storing data.

The components in reader 112 may be connected by one or more bus 168 or data lines, such as an Inter-IC bus such as an I²C bus, which is a control bus that provides a communications link between integrated circuits in a system. This bus may connect to a host computer in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 involves the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160. One of the functions of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1 symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Imaging reader assembly 114 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an animorphic lens with two different radii of curvature on their orthogonal lens axis. Alternately, the aimer pattern generator may be a laser pattern generator.

The light sources 132 may also be comprised of one or more laser diodes such as those available from Rohm. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind. Examples of these types of elements are known, commercially available items and may be purchased, for example, from Digital Optics Corp. of Charlotte, N.C. among others. Elements of some of these types and methods for making them are also described in U.S. Pat. No. 4,895,790 (Swanson); U.S. Pat. No. 5,170,269 (Lin et al) and U.S. Pat. No. 5,202,775 (Feldman et al), which are hereby incorporated herein by reference.

Image reader may include an illumination assembly 142 for illuminating target area T. Illumination assembly 142 may also include one or more power supplies 144, illumination sources 146 and illumination optics 148.

Figure 3A:
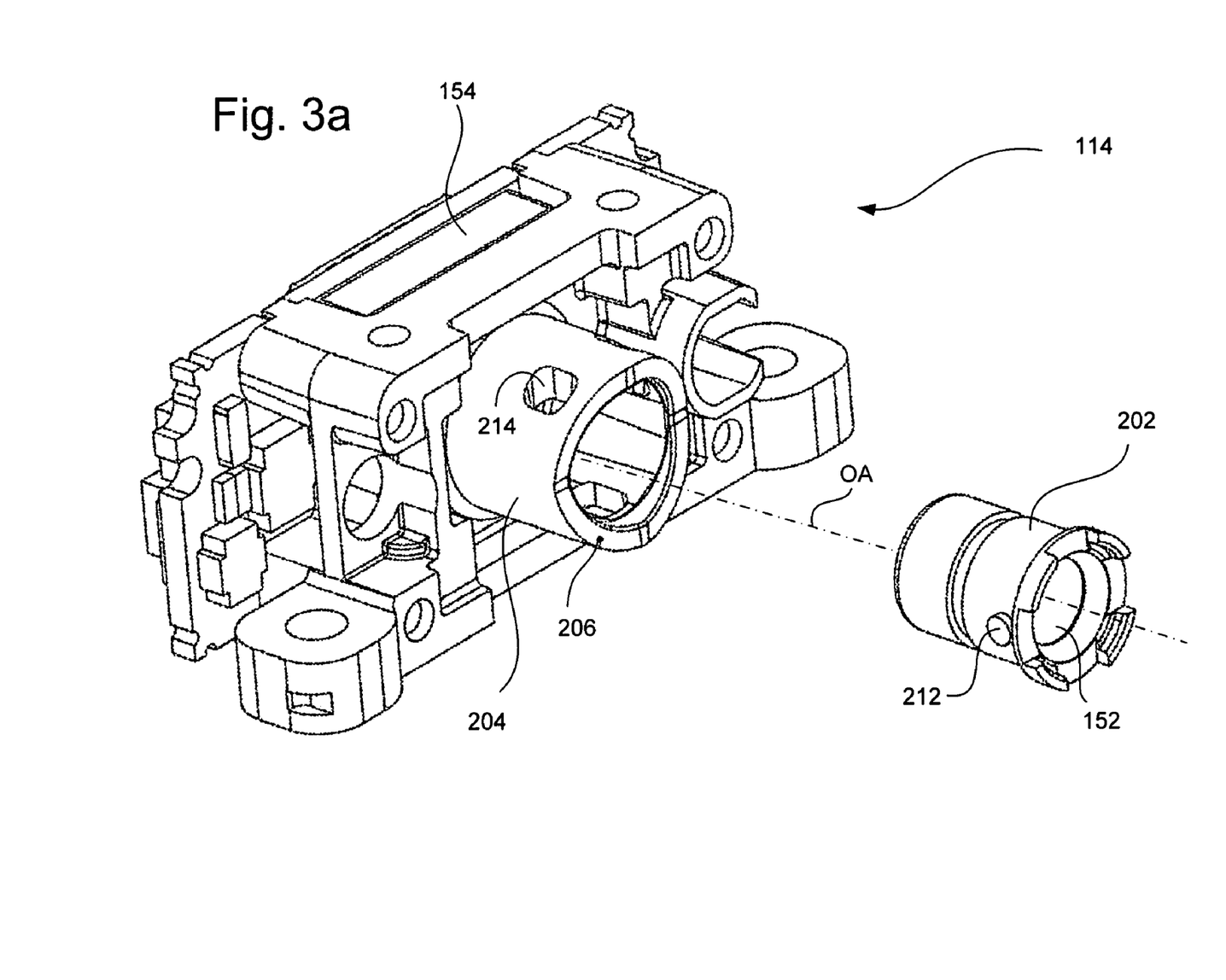
FIG. 3a is a perspective assembly view of a partially assembled exemplary imaging module in accordance with the invention.
Figure 3B:
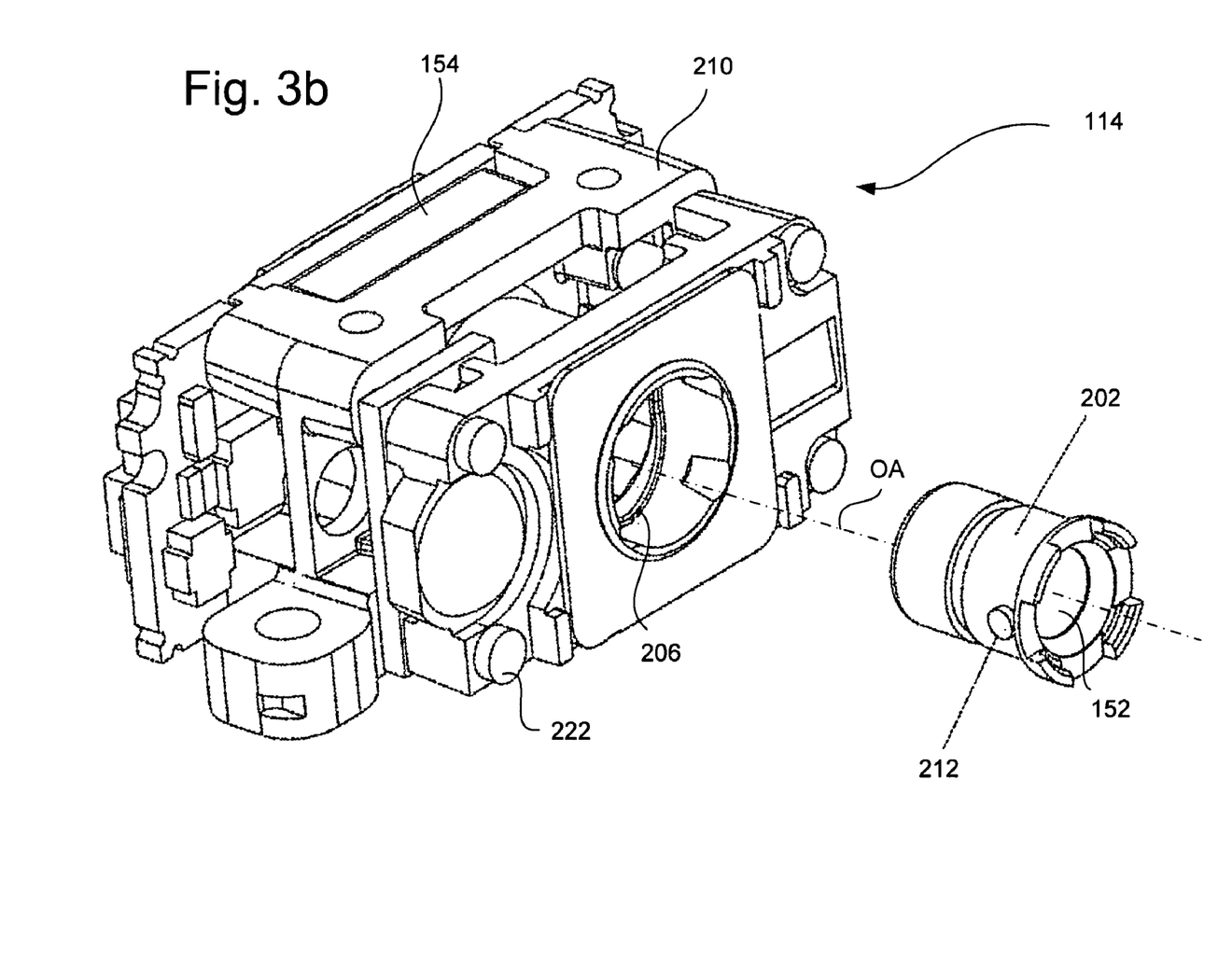
FIG. 3b is a perspective assembly view of an exemplary imaging module in accordance with the invention.
Figure 3C:
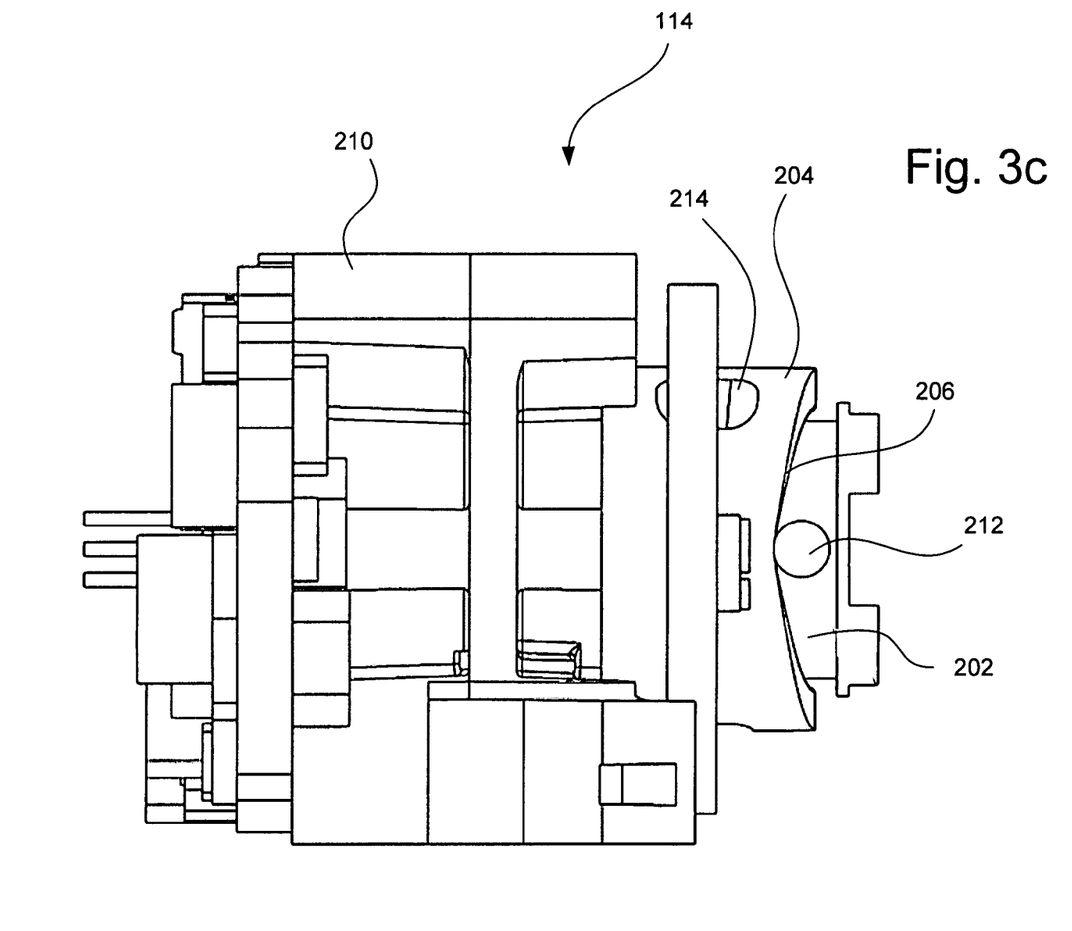
FIG. 3c is a side view of an exemplary imaging module in accordance with the invention.

Referring to FIG. 3a, FIG. 3b and 3c, an exemplary imaging reader assembly 114 may include imaging receive optics 152 disposed or contained within a generally cylindrical barrel 202. Barrel 202 is slidably disposed or contained within a generally cylindrical sleeve 204. Sleeve 204 is secured to an imager assembly body 210 which may provide a platform for, amongst other items, the image sensor 154. When barrel 202 is moved axially within sleeve 204, the imaging optics 152 may be brought in and out of focus with the image sensor 154. Imaging optics 152 may therefore be positioned to a precise desired location within sleeve 204 in order to bring the target in focus with the image sensor. For such precision locating, a curved or ramped shoulder 206 is provided on sleeve 204. One or more protrusions (tabs, bosses, spurs, tines, pins, etc.) 212 are provided on barrel 202 to mate or engage with shoulder 206. The barrel 202 is inserted into sleeve 204 until the protrusions engage with shoulder 206. The barrel 202 is rotated such that protrusions ride along shoulder which changes the position of optics 152 along the optical axis OA to precisely locate optics 152 at a desired location relative to image sensor 154. After the optics are appropriately located the barrel 202 may be fixed in place by injecting glue or adhesive into one or more hole 214 provided through sleeve 204.

The "ramp" feature of shoulder 206 may be provided within the sleeve 204 or on the end of the sleeve 204 and be a helix similar to that of a screw thread, wherein the pitch and slope is such that as the barrel 202 is rotated and the protrusions ride along the ramp features to provide approximate linear motion along the ramp. This linear type motion for each degree of rotation may remain the same regardless of the position of the protrusion on the ramp excepting at the very top or the very bottom where the radii is located. The "pitch" of this helix is designed to provide full amount of linear travel needed for various focus positions (including part tolerances). The ramp may be comprised of different shapes. For example, the ramp may be shaped to adjust linear movement to be fine or coarse in different section of the ramp.

Figure 4A:
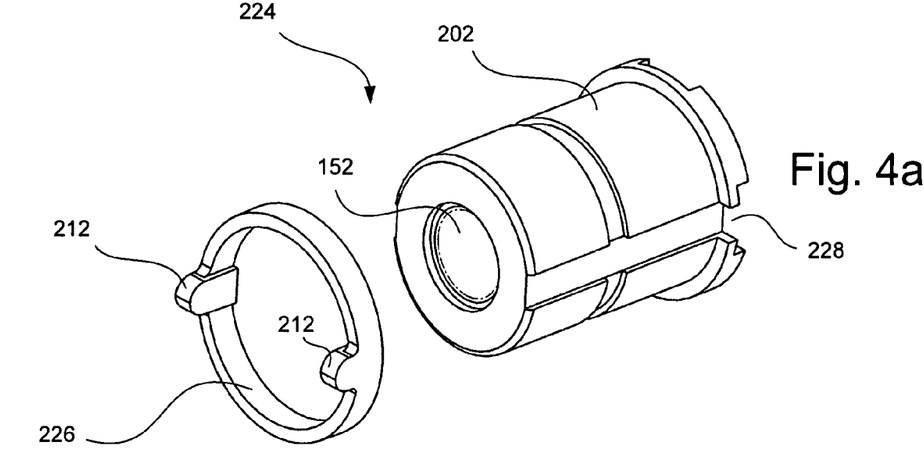
FIG. 4a is a perspective assembly view of a partially assembled exemplary barrel assembly in accordance with the invention.
Figure 4B:
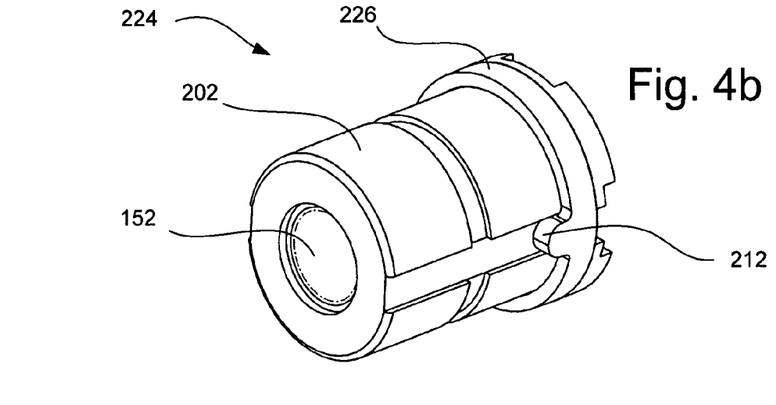
FIG. 4b is a perspective assembly view of an exemplary barrel assembly in accordance with the invention.

Referring to FIG. 4a and FIG. 4b, an exemplary barrel assembly 224 includes a barrel 202 for holding image assembly optics 152. Protrusions 212 may be provided as part of a ring or collar 226 which is slid onto the barrel 202. The ring may be rotationally fixed onto the barrel utilizing one or more slots 228.

In an example, protrusions may be located in the housing the ramp may be located on the lens.

In the present disclosed embodiments, two protrusions 212 are contemplated, which are positioned symmetrically on opposite sides of barrel 202, and engage respective ramps also provided symmetrically on the end of sleeve 206 proximate protrusions 212.

Different numbers of protrusions and protrusions located at different "heights" may be utilized.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. For example, the steps of the flow diagrams may be taken in sequences other than those described, and more, fewer or other elements may be used in the block diagrams. Also, unless applicants have expressly disavowed any subject matter within this application, no particular embodiment or subject matter is considered to be disavowed herein.

The invention claimed is:

1. An optical reader comprising:
   an image sensor array of pixels for converting light reflected from a target containing a machine readable indicia into output signals representative thereof;
   a housing for holding the image sensor array;
   a processor for decoding the output signals;
   receive optics for directing light from the target to the image sensor, the optics having a focal point;
   a generally cylindrical barrel for containing the receive optics, the barrel having a protrusion provided thereon;
   a generally cylindrical sleeve for receiving the barrel, the sleeve being secured to the housing and having a ramped shoulder for engagement with the protrusion,
   wherein moving the protrusion along the shoulder facilitates focusing of the receive optics relative to the image sensor.

2. An optical reader in accordance with claim 1, wherein movement of the protrusion is accomplished by rotating the barrel relative to the sleeve.

3. An optical reader in accordance with claim 1, wherein the barrel is fixed within the sleeve when the optics are desirably located.

4. An optical reader in accordance with claim 3, wherein the barrel is fixed utilizing an adhesive.

5. An optical reader in accordance with claim 1, wherein the sleeve comprises an end proximate the protrusion and the shoulder is provided on the end.

6. An optical reader in accordance with claim 1, further comprising an aiming pattern generator for directing an aimer light beam onto the target.

7. An optical reader in accordance with claim 1, wherein the protrusion is provided as part of a collar disposed around the barrel.

8. A method of focusing an optical reader the optical reader comprising: an image sensor array of pixels for converting light reflected from a target containing a machine readable indicia into output signals representative thereof; a housing for holding the image sensor array; a processor for decoding the output signals; receive optics for directing light from the target to the image sensor, the optics having a focal point; a generally cylindrical barrel for containing the receive optics, the barrel having a protrusion provided thereon; a generally cylindrical sleeve for receiving the barrel, the sleeve being secured to the housing and having a ramped shoulder for engagement with the protrusion, the method comprising the step of moving the protrusion along the shoulder to focus the receive optics relative to the image sensor.

9. A method in accordance with claim 8, wherein movement of the protrusion is accomplished by rotating the barrel relative to the sleeve.

10. A method in accordance with claim 8, wherein the barrel is fixed in the sleeve when the optics are desirably located.

11. A method in accordance with claim 10, wherein the barrel is fixed utilizing an adhesive.

12. A method in accordance with claim 8, wherein the sleeve comprises an end proximate the protrusion and the shoulder is provided on the end.

13. A method in accordance with claim 8, further comprising an aiming pattern generator for directing an aimer light beam onto the target.

14. An method in accordance with claim 8, wherein the protrusion is provided as part of a collar disposed around the barrel.

* * * * *